US012804318B2

(12) United States Patent
Wurtz et al.

(10) Patent No.: US 12,804,318 B2

(45) Date of Patent: Nov. 17, 2026

(54) IN-BAND RESONANCE PIEZO MEMS MICROPHONES

(71) Applicant: SKYWORKS SOLUTIONS, INC., Irvine, CA (US)

(72) Inventors: Michael Jon Wurtz, Lake Oswego, OR (US); Humberto Campanella-Pineda, Singapore (SG)

(73) Assignee: Skyworks Solutions, Inc., Irvine, CA (US)

( * ) Notice: Subject to any disclaimer, the term of this patent is extended or adjusted under 35 U.S.C. 154(b) by 19 days.

(21) Appl. No.: 18/120,336

(22) Filed: Mar. 10, 2023

(65) Prior Publication Data

US 2023/0292045 A1 Sep. 14, 2023

Related U.S. Application Data

(60) Provisional application No. 63/318,575, filed on Mar. 10, 2022.

(51) Int. Cl.

| | |
|---|---|
| ***H04R 3/04*** | (2006.01) |
| ***H04R 17/02*** | (2006.01) |
| ***H04R 17/10*** | (2006.01) |
| ***H04R 29/00*** | (2006.01) |

(52) U.S. Cl.

CPC ............... *H04R 3/04* (2013.01); *H04R 17/02* (2013.01); *H04R 17/10* (2013.01); *H04R 29/004* (2013.01); *H04R 2201/003* (2013.01)

(58) Field of Classification Search

CPC .......... H04R 3/04; H04R 17/02; H04R 17/10; H04R 29/004; H04R 2201/003; H04R 2430/01; H04R 1/38; H04R 3/06; G01D 18/00; G01H 13/00; B81C 1/00873; B81B 7/0064; B81B 7/008; B81B 7/0067; B81B 7/0061; B61C 1/00301

See application file for complete search history.

(56) References Cited

U.S. PATENT DOCUMENTS

| | | | | |
|---|---|---|---|---|
| 10,001,391 | B1 * | 6/2018 | Littrell | G01D 18/00 |
| 2011/0085686 | A1 * | 4/2011 | Bhandari | H04R 3/005 381/313 |
| 2013/0170681 | A1 * | 7/2013 | Kohl | H04R 19/04 381/320 |
| 2015/0131819 | A1 * | 5/2015 | Straeussnigg | H04R 1/04 381/173 |
| 2015/0214912 | A1 * | 7/2015 | Khenkin | H04R 3/06 381/102 |
| 2016/0037245 | A1 * | 2/2016 | Harrington | H04R 1/08 381/111 |
| 2016/0241961 | A1 * | 8/2016 | Josefsson | H03G 5/005 |
| 2017/0164118 | A1 * | 6/2017 | Wiesbauer | H04R 1/04 |

(Continued)

*Primary Examiner* — Carolyn R Edwards

*Assistant Examiner* — Kuassi A Ganmavo

(74) *Attorney, Agent, or Firm* — Chang & Hale LLP

(57) ABSTRACT

In some embodiments, a microphone can include a piezoelectric sensor configured to provide a response to acoustic energy in a frequency band, with the response including an in-band resonance having a peak frequency within the frequency band. The microphone can further include an equalizer coupled to the piezoelectric sensor and configured to provide equalization of the response of the piezoelectric sensor, such that the equalizer removes or adjusts the in-band resonance from the response of the piezoelectric sensor.

15 Claims, 14 Drawing Sheets

(56) References Cited

U.S. PATENT DOCUMENTS

| | | | | |
|---|---|---|---|---|
| 2017/0280237 | A1* | 9/2017 | Kopetz | H04R 19/005 |
| 2018/0288523 | A1* | 10/2018 | Lesso | H04R 29/004 |
| 2020/0404429 | A1* | 12/2020 | Schultz | H04R 1/04 |
| 2021/0127212 | A1* | 4/2021 | Zou | H04R 1/028 |
| 2021/0231701 | A1* | 7/2021 | Nguyen | G01P 15/097 |
| 2021/0360347 | A1* | 11/2021 | Aschieri | H03F 3/183 |
| 2021/0382085 | A1* | 12/2021 | Bretthauer | H10N 30/87 |
| 2022/0377466 | A1* | 11/2022 | Tanemura | H03G 5/165 |

* cited by examiner

IN-BAND RESONANCE PIEZO MEMS MICROPHONES

CROSS-REFERENCE TO RELATED APPLICATION(S)

This application claims priority to U.S. Provisional Application No. 63/318,575 filed Mar. 10, 2022, entitled IN-BAND RESONANCE PIEZO MEMS MICROPHONES, the disclosure of which is hereby expressly incorporated by reference herein in its entirety.

BACKGROUND

Field

The present disclosure relates to piezo microphones including micro electrical mechanical sensor (MEMS) microphones.

Description of the Related Art

A piezoelectric sensor is designed to convert acoustic energy into an electrical signal. Thus, such a piezoelectric sensor can be configured as a microphone that converts sound into an electrical signal. In some applications, such a piezoelectric microphone can be implemented as a micro electrical mechanical sensor (MEMS).

SUMMARY

In accordance with a number of implementations, the present disclosure relates to a microphone that includes a piezoelectric sensor configured to provide a response to acoustic energy in a frequency band. The response includes an in-band resonance having a peak frequency within the frequency band. The microphone further includes an equalizer coupled to the piezoelectric sensor and configured to provide equalization of the response of the piezoelectric sensor, such that the equalizer removes or adjusts the in-band resonance from the response of the piezoelectric sensor.

In some embodiments, the piezoelectric sensor can be implemented as a micro-electromechanical systems (MEMS) device. The MEMS device can be implemented as, for example, a cantilever structure.

In some embodiments, the equalizer can be configured to provide the equalization in digital domain. In some embodiments, the equalizer can be part of an application-specific integrated circuit.

In some embodiments, the application-specific integrated circuit can further include an analog-to-digital converter (ADC) that receives an analog signal from the piezoelectric sensor and generates a digital signal representative of the analog signal.

In some embodiments, the application-specific integrated circuit can further include a non-transitory computer readable medium having or capable of having calibration data specific for the piezoelectric sensor to allow the removal or adjustment of the in-band resonance from the response of the piezoelectric sensor.

In some embodiments, the calibration data specific for the piezoelectric sensor can be provided to the non-transitory computer readable medium in a calibration process during or after production of the microphone.

In some embodiments, the calibration data specific for the piezoelectric sensor can include data representative of temperature dependence of the equalization of the response of the piezoelectric sensor. In some embodiments, the application-specific integrated circuit can further include a temperature sensor configured to provide temperature information for the temperature dependence of the equalization of the response of the piezoelectric sensor.

In some embodiments, the calibration data specific for the piezoelectric sensor can include data representative of low frequency corner property of the piezoelectric sensor.

In some embodiments, the frequency band can include an audible frequency band, such as a range of 20 Hz to 20,000 Hz.

In some implementations, the present disclosure relates to a microphone that includes a piezoelectric sensor configured to provide a response to acoustic energy in a frequency band, with the response including an in-band resonance having a peak frequency within the frequency band. The microphone further includes a processing component coupled to the piezoelectric sensor and configured to provide an adjustment to the response of the piezoelectric sensor to correct for a low-frequency corner variation associated with the piezoelectric sensor.

In some embodiments, the processing component can be implemented as an equalizer. The equalizer can be further configured to provide equalization of the response of the piezoelectric sensor, such that the equalizer removes or adjusts the in-band resonance from the response of the piezoelectric sensor.

In some embodiments, the piezoelectric sensor can be implemented as a micro-electromechanical systems (MEMS) device.

In some implementations, the present disclosure relates to a microphone that includes a piezoelectric sensor configured to provide a response to acoustic energy in a frequency band, with the response including an in-band resonance having a peak frequency within the frequency band. The microphone further includes an equalizer coupled to the piezoelectric sensor and configured to provide equalization of the response of the piezoelectric sensor. The microphone further includes a temperature compensation component configured to adjust the equalization based on temperature dependence of the equalization.

In some embodiments, the temperature compensation component can include a temperature sensor implemented to sense temperature representative of the equalizer. In some embodiments, the equalizer can be further configured to remove or adjust the in-band resonance from the response of the piezoelectric sensor.

In some implementations, the present disclosure relates to a microphone that includes a packaging substrate and a microphone implemented on the packaging substrate. The microphone includes a piezoelectric sensor configured to provide a response to acoustic energy in a frequency band, with the response including an in-band resonance having a peak frequency within the frequency band. The microphone further includes an equalizer coupled to the piezoelectric sensor and configured to provide equalization of the response of the piezoelectric sensor, such that the equalizer removes or adjusts the in-band resonance from the response of the piezoelectric sensor.

In some embodiments, the piezoelectric sensor can be implemented as a micro-electromechanical systems (MEMS) device.

In some implementations, the present disclosure relates to a microphone that includes a packaging substrate and a microphone implemented on the packaging substrate. The microphone includes a piezoelectric sensor configured to provide a response to acoustic energy in a frequency band, with the response including an in-band resonance having a peak frequency within the frequency band. The microphone further includes a processing component coupled to the piezoelectric sensor and configured to provide an adjustment to the response of the piezoelectric sensor to correct for a low-frequency corner variation associated with the piezoelectric sensor.

In some embodiments, the processing component can be implemented as an equalizer that is further configured to provide equalization of the response of the piezoelectric sensor, such that the equalizer removes or adjusts the in-band resonance from the response of the piezoelectric sensor.

In some embodiments, the piezoelectric sensor can be implemented as a micro-electromechanical systems (MEMS) device.

In some implementations, the present disclosure relates to a microphone that includes a packaging substrate and a microphone implemented on the packaging substrate. The microphone includes a piezoelectric sensor configured to provide a response to acoustic energy in a frequency band, with the response including an in-band resonance having a peak frequency within the frequency band. The microphone further includes an equalizer coupled to the piezoelectric sensor and configured to provide equalization of the response of the piezoelectric sensor. The microphone further includes a temperature compensation component configured to adjust the equalization based on temperature dependence of the equalization.

In some embodiments, the packaged module can further include a temperature sensor implemented to sense temperature representative of the equalizer.

In some embodiments, the equalizer can be further configured to remove or adjust the in-band resonance from the response of the piezoelectric sensor.

In some implementations, the present disclosure relates to an electronic device that includes a microphone having a piezoelectric sensor configured to provide a response to acoustic energy in a frequency band, with the response including an in-band resonance having a peak frequency within the frequency band. The microphone further includes an equalizer coupled to the piezoelectric sensor and configured to provide equalization of the response of the piezoelectric sensor, such that the equalizer removes or adjusts the in-band resonance from the response of the piezoelectric sensor. The electronic device further includes an electronic circuit configured to utilize a signal representative of an analog signal output by the piezoelectric sensor and equalized by the equalizer.

In some embodiments, the frequency band can include an audio frequency range such as a range of 20 to 20,000 Hz.

In some embodiments, the audio device can include a portable electronic device such as a wireless device.

In some implementations, the present disclosure relates to an electronic device that includes a microphone having a piezoelectric sensor configured to provide a response to acoustic energy in a frequency band, with the response including an in-band resonance having a peak frequency within the frequency band. The microphone further includes a processing component coupled to the piezoelectric sensor and configured to provide an adjustment to the response of the piezoelectric sensor to correct for a low-frequency corner variation associated with the piezoelectric sensor. The electronic device further includes an electronic circuit configured to utilize a signal representative of an analog signal output by the piezoelectric sensor and adjusted by the processing component.

In some implementations, the present disclosure relates to an electronic device that includes a microphone having a piezoelectric sensor configured to provide a response to acoustic energy in a frequency band, with the response including an in-band resonance having a peak frequency within the frequency band. The microphone further includes an equalizer coupled to the piezoelectric sensor and configured to provide equalization of the response of the piezoelectric sensor. The microphone further includes a temperature compensation component configured to adjust the equalization based on temperature dependence of the equalization. The electronic device further includes an electronic circuit configured to utilize a signal representative of an analog signal output by the piezoelectric sensor and equalized by the equalizer.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Figure 1A:
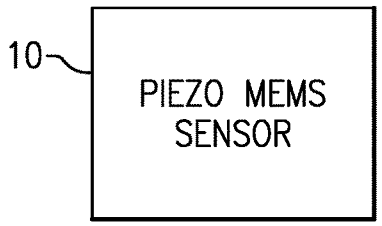
FIG. 1A depicts a conventional piezoelectric sensor implemented as a micro electrical mechanical sensor (MEMS) device.
Figure 1B:
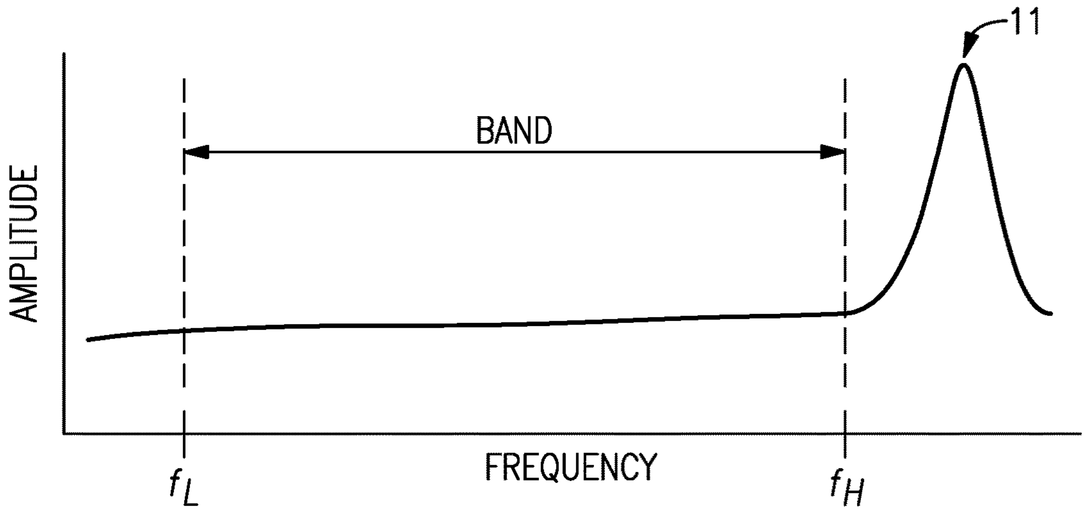
FIG. 1B shows that the conventional piezoelectric sensor of FIG. 1A is designed such that a resonance frequency associated with the sensor is outside of an operating frequency band.

FIG. 1A depicts a conventional piezoelectric sensor 10 implemented as a micro electrical mechanical sensor (MEMS) device. FIG. 1B shows that the conventional piezoelectric sensor 10 of FIG. 1A is typically designed such that a resonance frequency (depicted as a resonance peak 11) associated with the sensor is outside of an operating frequency band between a lower-limit frequency $f_L$ and an upper-limit frequency $f_H$. For audio applications, such lower-limit and upper-limit frequencies $f_L$, $f_H$ can be, for example, 20 Hz and 20,000 Hz, respectively.

Figure 2A:
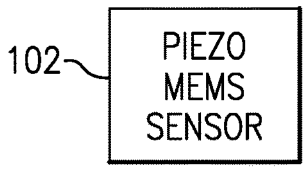
FIG. 2A depicts a piezoelectric sensor implemented as a MEMS device having one or more features as described herein.

FIG. 2A depicts a piezoelectric sensor 102 implemented as a MEMS device having one or more features as described herein.

Figure 2B:
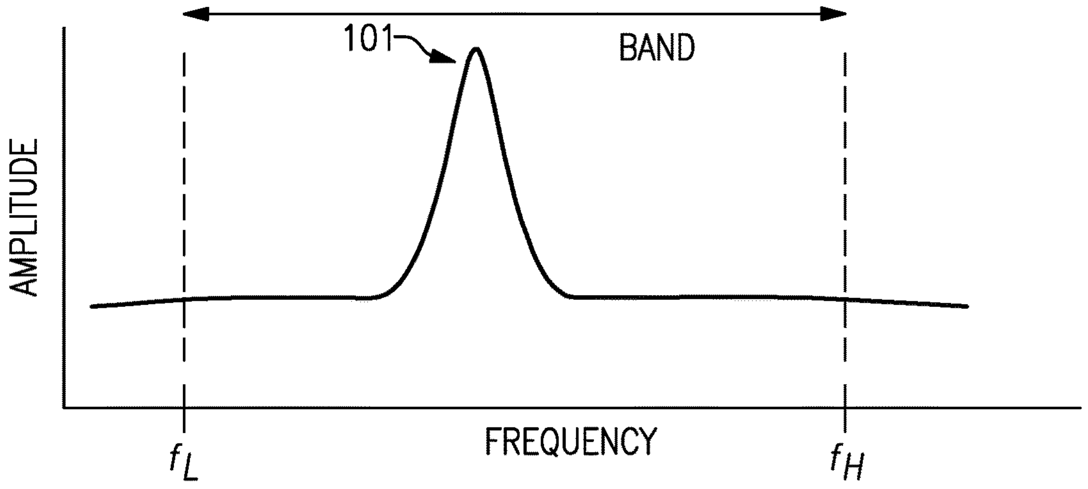
FIG. 2B shows that the piezoelectric sensor of FIG. 2A can be designed such that a resonance frequency associated with the sensor is within an operating frequency band to provide an in-band resonance (IBR).

FIG. 2B shows that the piezoelectric sensor 102 of FIG. 2A can be designed such that a resonance frequency (depicted as a resonance peak 101) associated with the sensor is within an operating frequency band to provide an in-band resonance (IBR). In the example of FIG. 2B, such a band can be an operating frequency band similar to the example of FIG. 1B.

Described herein are various examples of devices, circuits and methods related to the piezoelectric micro-electromechanical systems (MEMS) sensor 102 of FIGS. 2A and 2B. For the purpose of description, piezoelectric may also be referred to herein as piezo, micro-electromechanical systems may also be referred to as MEMS, and in-band resonance may also be referred to as IBR.

Figure 3:
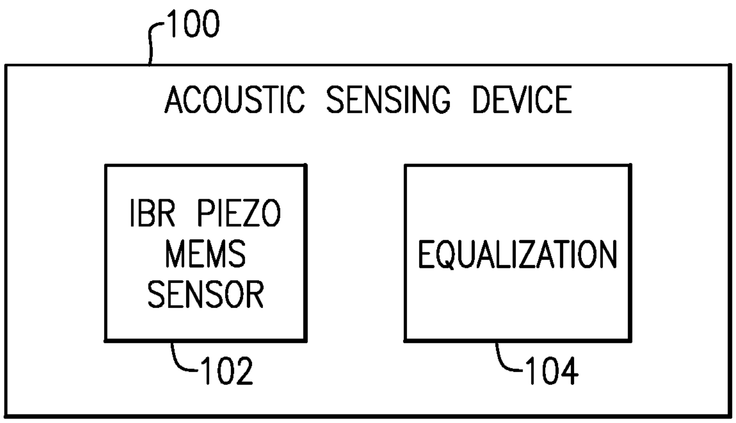
FIG. 3 shows that in some embodiments, an acoustic sensing device can include the piezoelectric MEMS sensor of FIGS. 2A and 2B, and an equalization component configured to account for the in-band resonance (IBR).

FIG. 3 shows that in some embodiments, an acoustic sensing device 100 can include an IBR piezo MEMS sensor 102 and an equalization component 104 that provides equalization of an output of the IBR piezo MEMS sensor 102. For the purpose of description, it will be understood that equalization can include an adjustment to a frequency response to provide a desired frequency response within a selected range. Such a desired frequency range may or may not be a uniform response.

Figure 4:
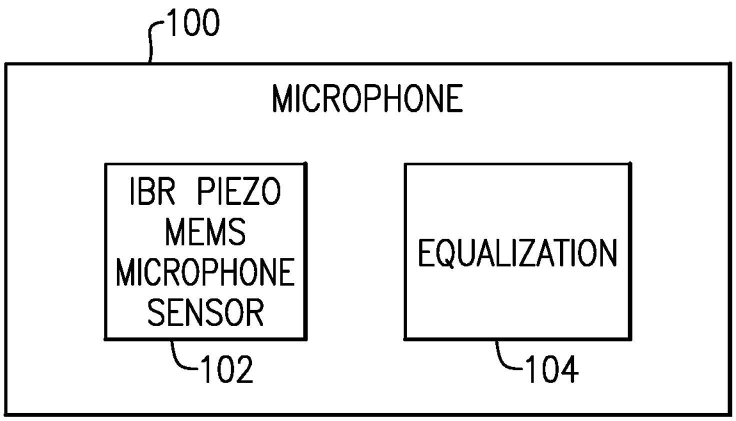
FIG. 4 shows that in some embodiments, the in-band resonance piezoelectric MEMS sensor of FIG. 3 can be implemented as a microphone sensor, such that the acoustic sensing device of FIG. 3 is a microphone.

FIG. 4 shows that in some embodiments, the acoustic sensing device 100 of FIG. 3 can be implemented as a microphone 100. Such a microphone can include an IBR piezo MEMS microphone sensor 102 and an equalization component 104 that provides equalization of an output of the IBR piezo MEMS microphone sensor 102.

In some embodiments, the IBR piezo MEMS microphone sensor 102 of FIG. 4 can be implemented as, for example, a piezo cantilever device having an IBR frequency within an operating range of the sensor 102. It will be understood that in some embodiments, an IBR piezo MEMS microphone sensor having one or more features as described herein can also be implemented as other types of piezo devices.

In some embodiments, the microphone 100 of FIG. 4 can be configured to allow calibration of equalization during or after production to account for the IBR property of the sensor 102. In some embodiments, such calibration and use of the calibration can be supported by the equalization component 104 of the microphone 100. Examples related to such calibration of equalization are described herein in greater detail.

In some embodiments, the microphone 100 of FIG. 4 can be configured to allow calibration of one or more characteristics of the sensor 102 during or after production. Such characteristics can include, for example, variance of low frequency corner property of the sensor, and temperature dependence of the equalization component 104. Examples related to such calibration of other features of the sensor 102 are described herein in greater detail.

Figure 5:
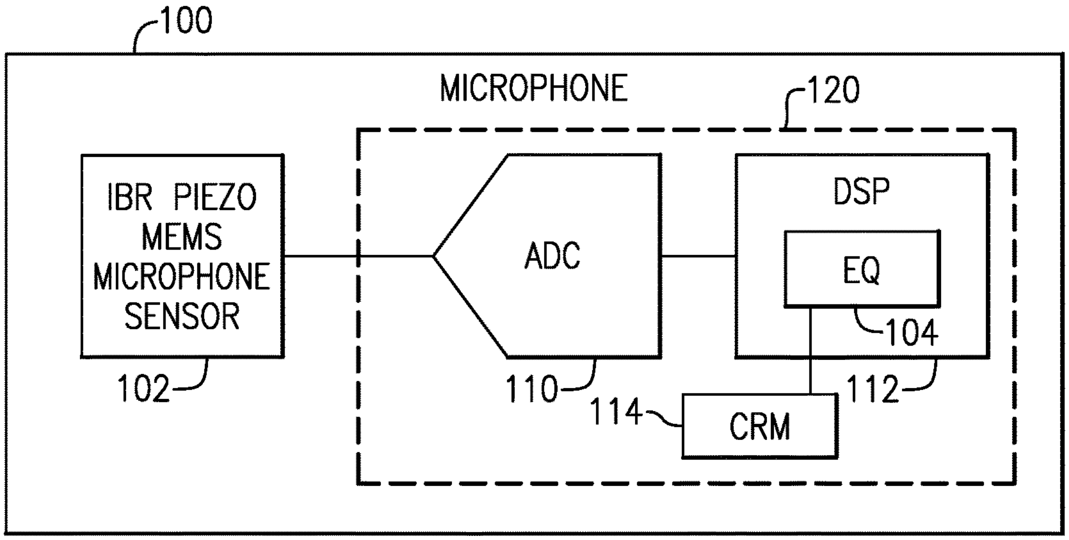
FIG. 5 shows a microphone that can be a more specific example of the microphone of FIG. 4.

FIG. 5 shows a microphone 100 that can be a more specific example of the microphone 100 of FIG. 4. Such a microphone can include an IBR piezo MEMS microphone sensor 102 and an equalization component 104 that provides equalization of an output of the IBR piezo MEMS microphone sensor 102. In the example of FIG. 5, the sensor 102 can output an analog signal, and such an analog signal can be amplified (e.g., by a pre-amplifier) before being converted into a digital signal by an analog-to-digital converter (ADC) 110. The digital signal provided by the ADC 110 can be processed by a digital signal processor (DSP) 112.

FIG. 5 shows that in some embodiments, the equalization component 104 of FIG. 4 can be implemented in digital domain. Thus, an equalization component (EQ) 104 in FIG. 5 can be implemented to be a part of and/or to operate with the digital signal processor 112.

FIG. 5 also shows that in some embodiments, the microphone 100 can include a computer-readable medium (CRM) 114 such as a non-transitory CRM accessible by the equalization component 104. Such a CRM can be utilized to store parameters associated with equalization of IBR (e.g., during calibration), and thereby allow equalization of digitized sensor signal during operation. In some embodiments, the CRM 114 can also store and calibration parameters associated with one or more other characteristics of the microphone 100 (e.g., variance of low frequency corner property of the sensor 102, and temperature dependence of the equalization component 104).

FIG. 5 shows that in some embodiments, some or all of the ADC 110, the DSP 112 and the CRM 114 can be implemented as an integrated circuit such as an application-specific integrated circuit (ASIC) 120.

In the example of FIG. 5, the foregoing equalization functionality is described in the context of digital domain. However, it will be understood that one or more features associated with equalization functionality can also be implemented in analog domain or some combination of analog and digital domains.

Figure 6:
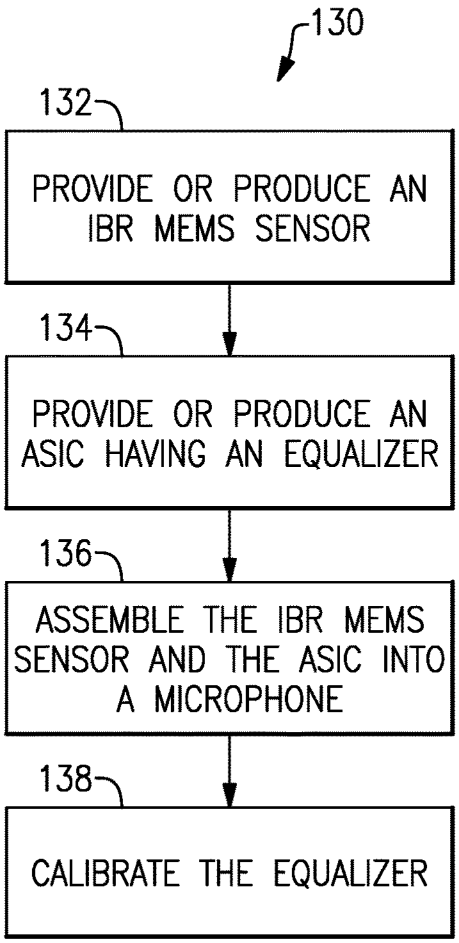
FIG. 6 shows an example process that can be implemented to produce the microphone of FIG. 5.
Figure 7:
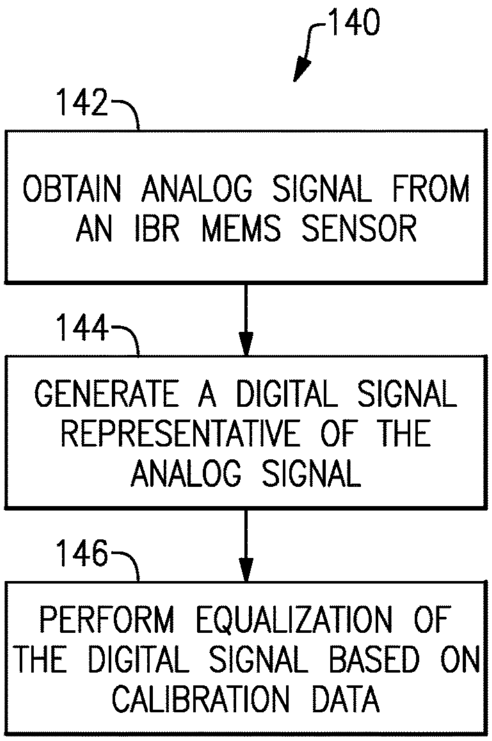
FIG. 7 shows an example process that can be utilized to operate the microphone of FIG. 5.

FIG. 6 shows an example process that can be implemented to produce the microphone 100 of FIG. 5, and FIG. 7 shows an example process that can be utilized to operate the microphone 100 of FIG. 5.

FIG. 6 shows that in some embodiments, a process 130 for producing a microphone can include a process block 132 where an IBR piezo MEMS microphone sensor can be provided or produced. In process block 134, an ASIC having an equalizer can be provided or produced. In process block 136, the IBR piezo MEMS microphone sensor and the ASIC can be assembled into a microphone. In process block 138, the equalizer can be calibrated. In some embodiments, data associated with such equalization calibration can be stored for use during operation of the microphone.

FIG. 7 shows that in some embodiments, a process 140 for operating a microphone can include a process block 142 where an analog signal is obtained from an IBR piezo MEMS microphone sensor. In process block 144, a digital signal representative of the analog signal can be generated. In process block 146, equalization of the digital signal can be performed based on calibration data. In some embodiments, such calibration data can be data stored during a calibration process.

Figure 8:
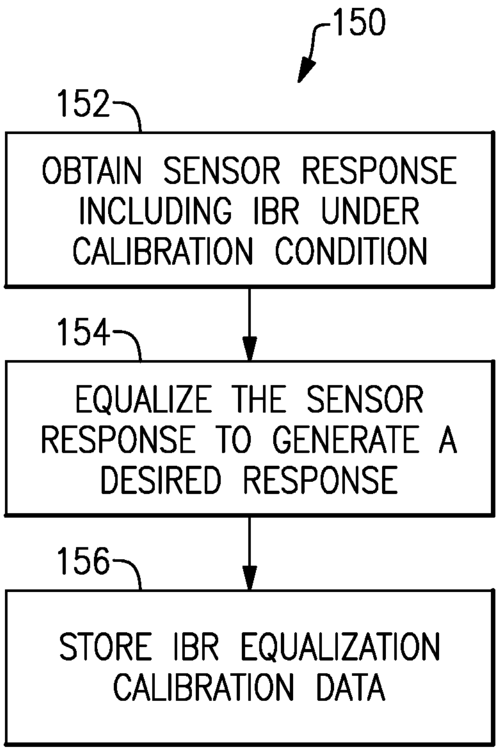
FIG. 8 shows an example process that can be implemented to calibrate the equalization component of the microphone of FIG. 5.
Figure 9:
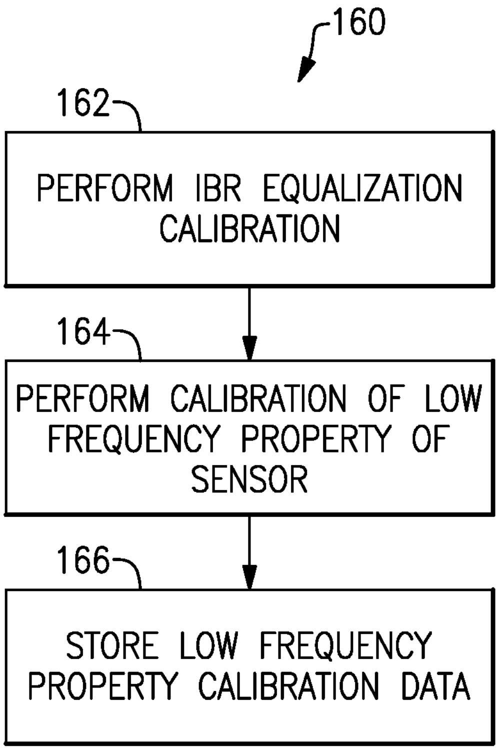
FIG. 9 shows an example process that can be implemented to calibrate the microphone of FIG. 5 to account for low frequency property of the microphone sensor.
Figure 10:
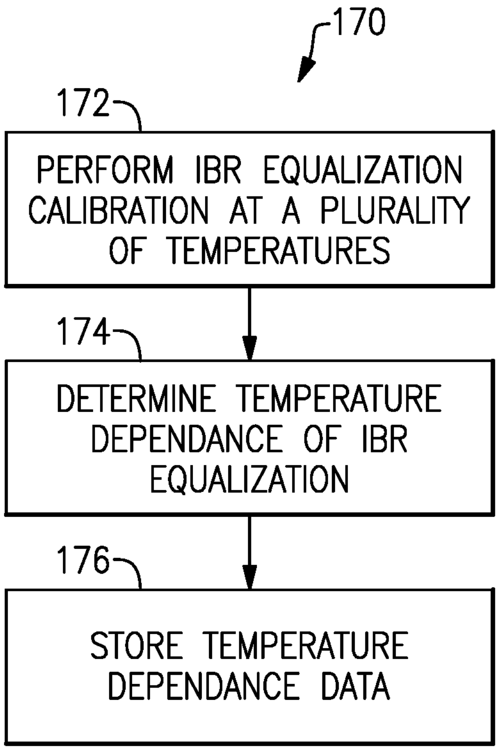
FIG. 10 shows an example process that can be implemented to calibrate the microphone of FIG. 5 to account for temperature dependence of the equalization component.

FIG. 8 shows an example of a process that can be implemented for the process block 138 of FIG. 6 to calibrate IBR equalization. FIG. 9 shows an example of a process that can be implemented for the process block 138 of FIG. 6 to calibrate low frequency property of the IBR piezo MEMS microphone sensor. FIG. 10 shows an example of a process that can be implemented for the process block 138 of FIG. 6 to calibrate temperature dependence of the equalization component.

FIG. 8 shows that in some embodiments, a process 150 can include a process block 152 where a sensor response including IBR under calibration condition can be obtained. In process block 154, the sensor response can be equalized to generate a desired response. In process block 154, calibration data representative of such equalization can be stored.

FIG. 9 shows that in some embodiments, a process 160 can include a process block 162 where IBR calibration can be performed (e.g., such as in FIG. 8). In process block 164, calibration of low frequency property of the sensor can be performed. In process block 166, calibration data representative of such low frequency calibration can be stored.

FIG. 10 shows that in some embodiments, a process 170 can include a process block 172 where IBR calibration can be performed (e.g., such as in FIG. 8) at a plurality of temperatures. In process block 174, temperature dependence of IBR equalization can be determined. In process block 176, data representative of such temperature dependence can be stored.

Figure 11:
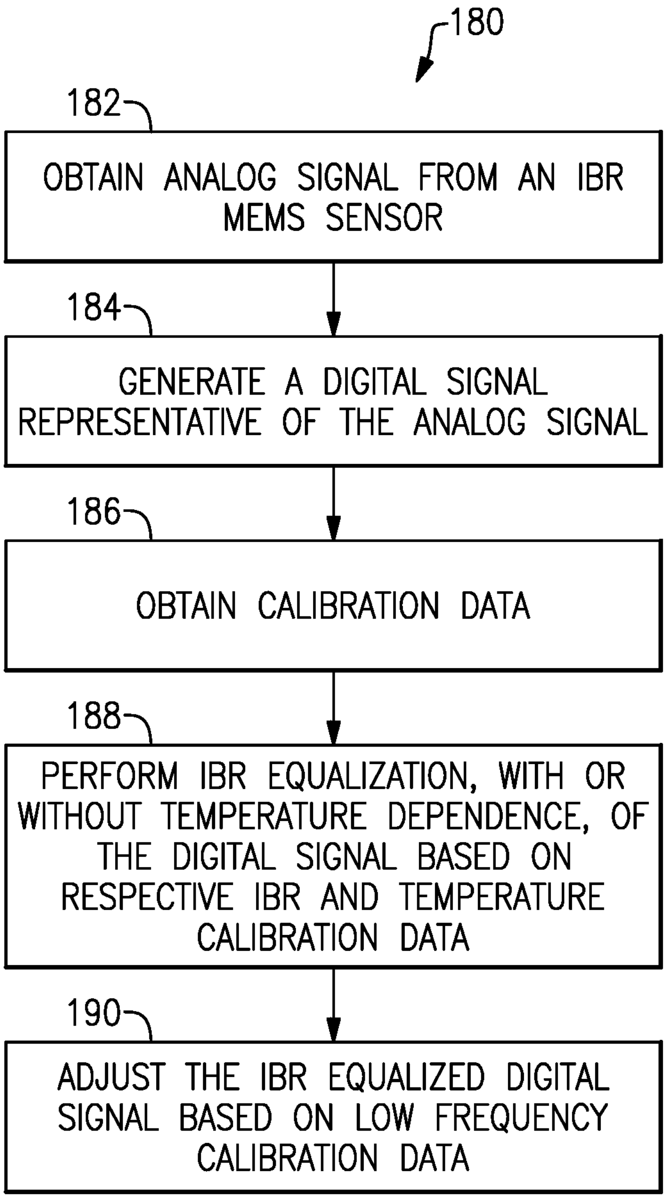
FIG. 11 shows a process that can be a more specific example of the process of FIG. 7.

FIG. 11 shows a process that can be a more specific example of the process 140 of FIG. 7. More particularly, FIG. 11 shows that in some embodiments, a process for operating a microphone can include a process block 182 where an analog signal is obtained from an IBR piezo MEMS microphone sensor. In process block 184, a digital signal representative of the analog signal can be generated. In process block 186, calibration data can be obtained. Such calibration data can include data for IBR equalization, as well as none, some or all of data for temperature dependance of IBR equalization and low frequency calibration. In process block 188, IBR equalization can be performed on the digital signal based on respective calibration data. In some embodiments, such IBR equalization can be performed with or without temperature dependence compensation. In process block 190, the IBR equalized digital signal can be adjusted based on the low frequency calibration data. In some embodiments, each of the foregoing temperature dependence compensation and low frequency compensation can be optional.

It is noted that a microphone having an IBR piezo MEMS microphone sensor, such as the microphone 100 of FIGS. 4 and 5 can include a number of desirable features. For example, in-band resonance can produce a sensitivity gain in the audio band that effectively is pre-emphasis that a production calibrated equalizer can correct for, thereby resulting in a significant signal-to-noise ratio (SNR) advantage. In another example, the foregoing SNR advantage does not require a lower noise analog front end or an associated power to have a lower noise floor. In yet another example, the IBR feature allows for a smaller sensor size, thereby reducing cost associated with the corresponding microphone. In yet another example, in some embodiments, once equalized, the in-band resonance can be eliminated or substantially reduced from the microphone's response and a new programmable low pass characteristic can be added.

It is also noted that implementation of equalization and/or calibration (e.g., post-production equalization and/or calibration) for an IBR piezo MEMS microphone can provide a number of desirable features. For example, a piezo cantilever microphone typically has an issue with poor control over the microphone's low frequency roll off tolerance. Such an effect can result due to stress across a wafer causing sensor cantilever deflection to vary, thereby making air leak across the sensor to vary significantly. Production equalization can address this issue by providing each individual microphone with an ideal or desirable equalizer configuration so the end product has very tight control over the low frequency corner.

In another example, post-production equalization can remove variation in response around resonance, thereby making the resulting response far flatter than other solutions such as condenser solutions. It is noted that piezo MEMS microphones are typically less sensitive to port loading than condenser microphones, thereby enabling the foregoing post-production equalization.

In yet another example, post-production equalization's frequency response variations with temperature have low sensitivity and could be temperature compensated by using, for example, a lookup table for coefficients and an on-ASIC temperature sensor.

Figure 12:
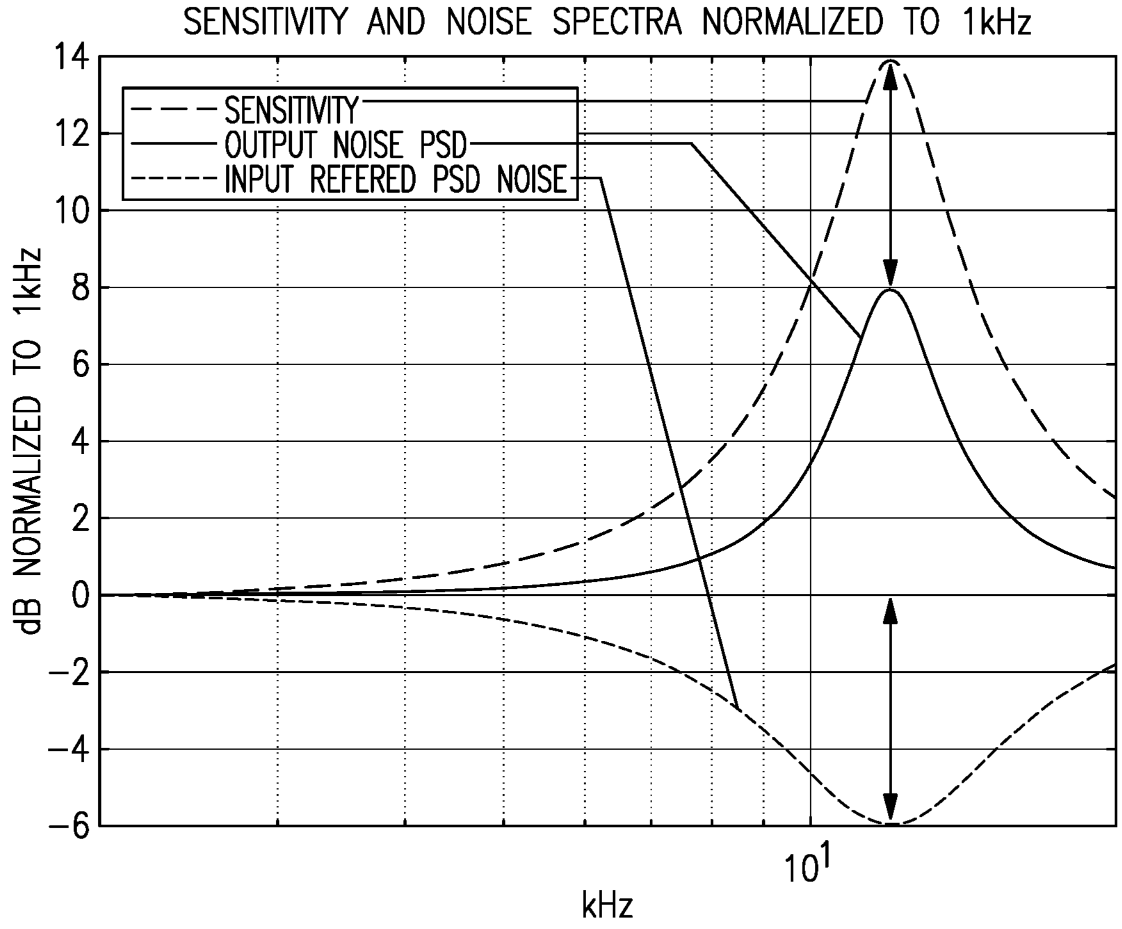
FIG. 12 shows an example of an advantageous feature of an IBR piezoelectric MEMS microphone having one or more features as described herein.

FIG. 12 shows an example of an advantageous feature of an IBR piezo MEMS microphone. It is noted that implementing a resonance in band can produce a significant advantage to an input referred noise distribution. Such an advantage is significant for IBR piezo MEMS microphones due at least in part to an additional electrical noise source from the piezo material. Thus, an approach similar to a pre-emphasis/de-emphasis approach can be utilized for SNR improvement where the pre-emphasis is provided by the microphone resonance. Such an approach can provide a benefit that includes a higher SNR without addition of more power.

Figure 13:
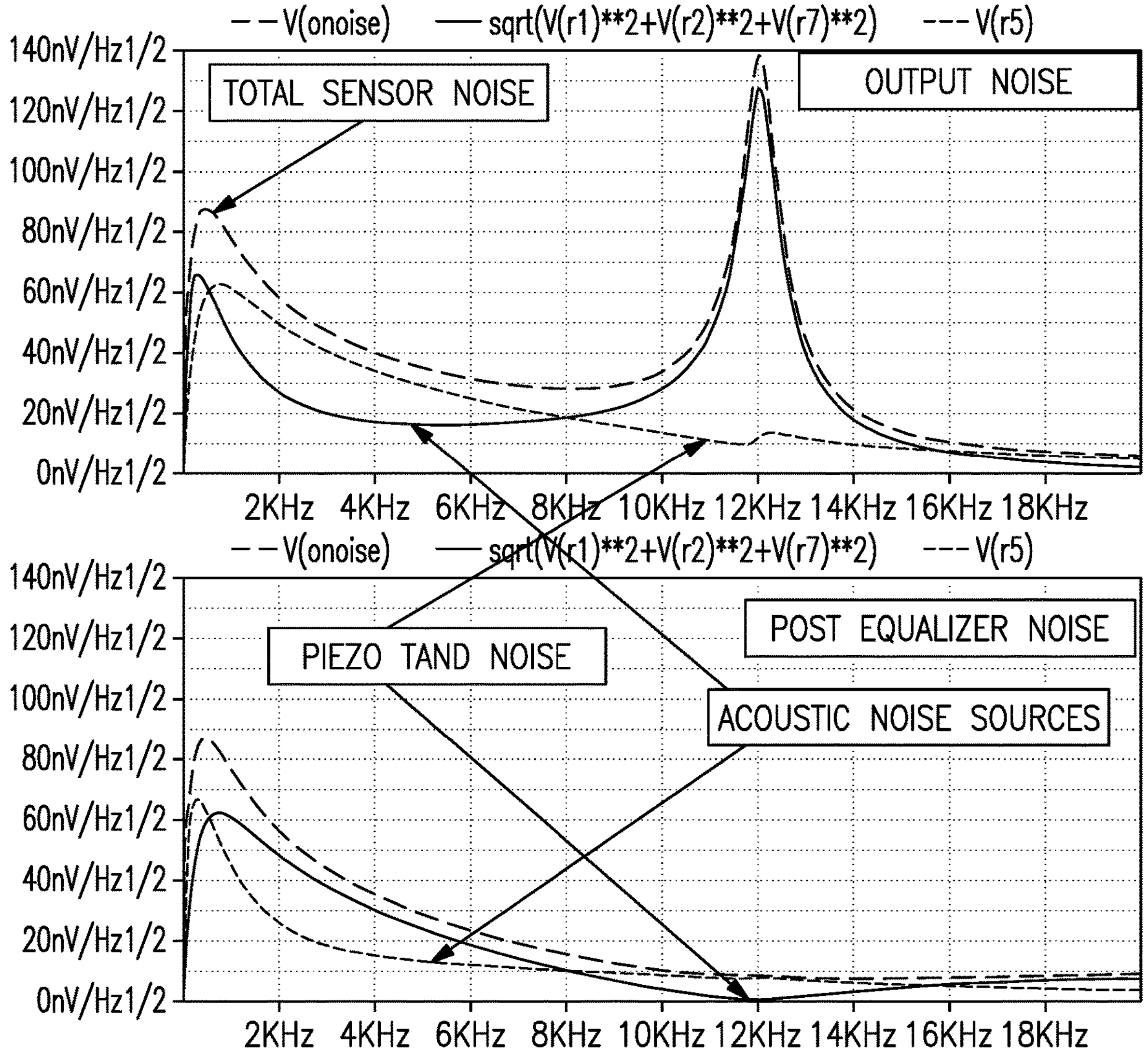
FIG. 13 shows another example of an advantageous feature of an IBR piezoelectric MEMS microphone having one or more features as described herein.

FIG. 13 shows simulation of IBR noise components without (upper panel) and with (lower panel) equalization. In FIG. 13, A-weighted noise power spectral density plots are shown for total sensor noise, acoustic noise sources, and piezo dielectric loss (Tan D) noise. One can see that an advantage of in-band resonance can result from equalization or de-emphasis impact on the piezo noise source.

Figure 14:
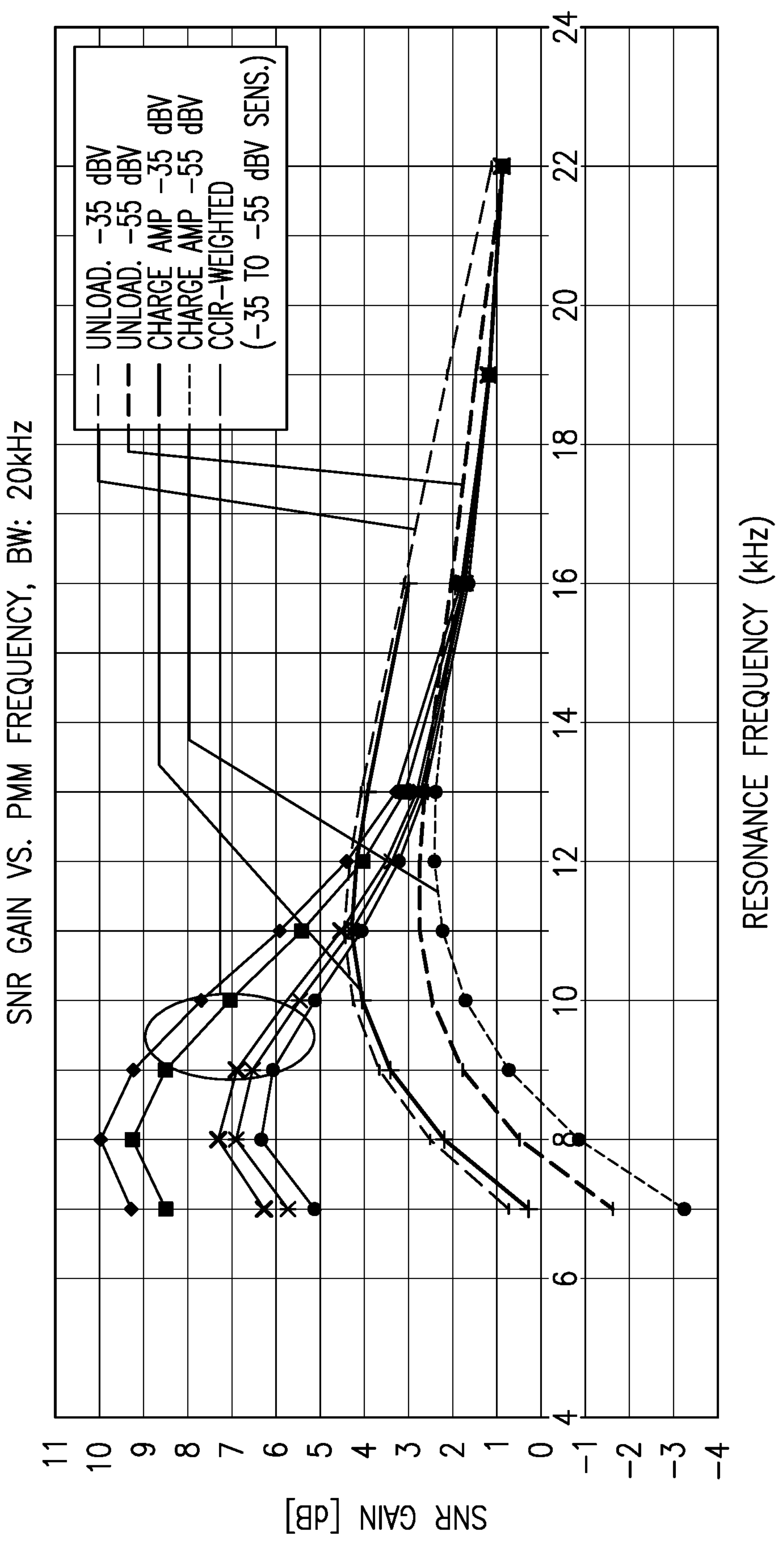
FIG. 14 shows an example of how resonance frequency can be selected for an IBR piezoelectric MEMS microphone.

FIG. 14 shows an example of how resonance frequency can be selected for an IBR piezo MEMS microphone. In FIG. 14, simulated results are shown for SNR advantage of different resonance frequencies, with equalized response to be approximately flat to a frequency greater than 20 KHz, and with ASIC noise included in the simulation.

For the example of FIG. 14, one can see that a 12 KHz resonance produces a near optimal A-weighted SNR advantage. For CCIR weighting, an optimal SNR benefit can be obtained with an 8 KHz resonance.

Figure 15A:
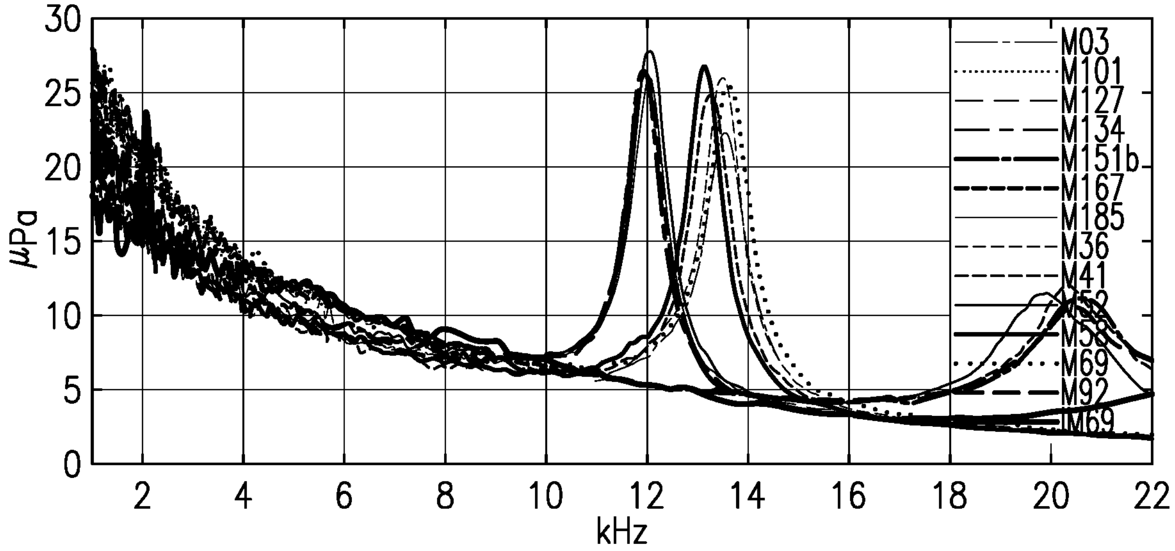
FIG. 15A shows A-weighted power spectral density response plots without equalization.
Figure 15B:
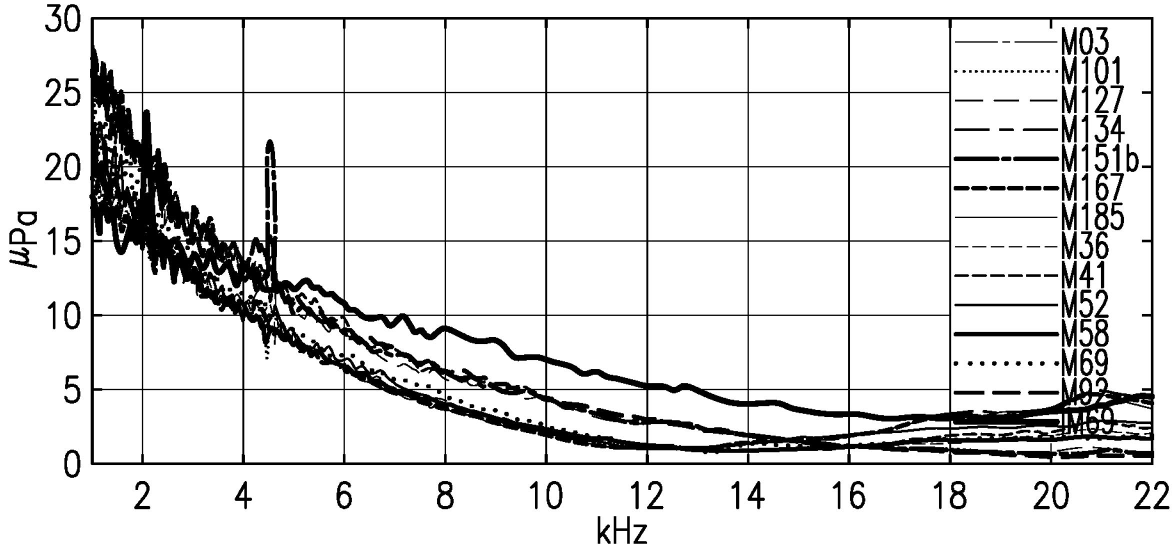
FIG. 15B shows A-weighted power spectral density response plots with equalization.

FIGS. 15A and 15B show A-weighted power spectral density response plots for various IBR frequencies of an IBR piezo MEMS microphone. More particularly, FIG. 15A shows A-weighted power spectral density response plots without equalization, and FIG. 15B shows A-weighted power spectral density response plots with equalization. From FIGS. 15A and 15B, one can see that for a 12 KHz resonance, an SNR improvement of about 3 dB is realized.

Figure 16A:
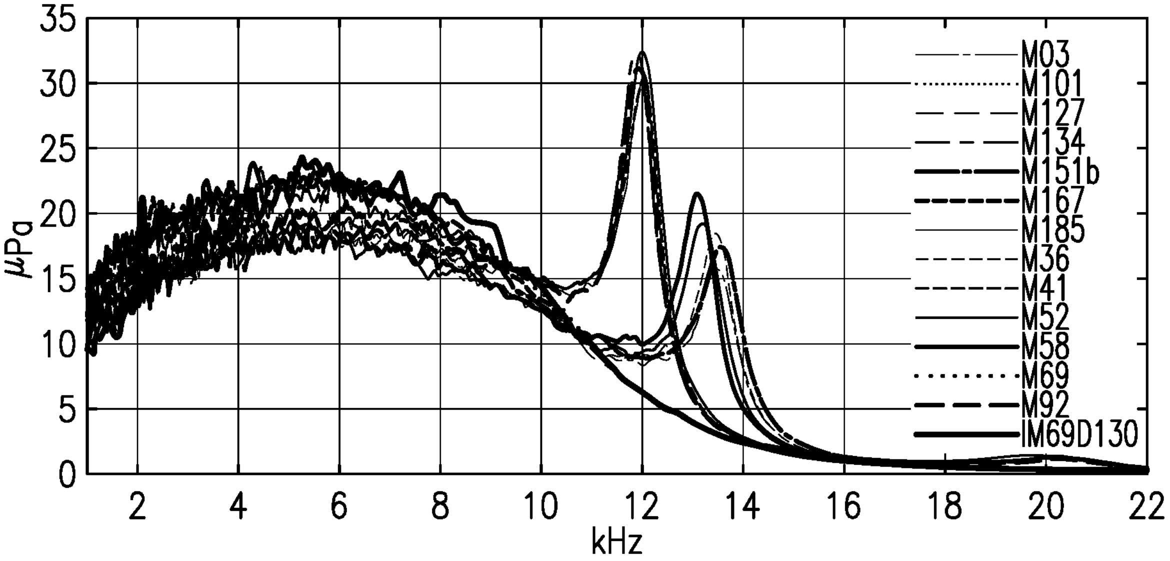
FIG. 16A shows CCIR-weighted power spectral density response plots without equalization.
Figure 16B:
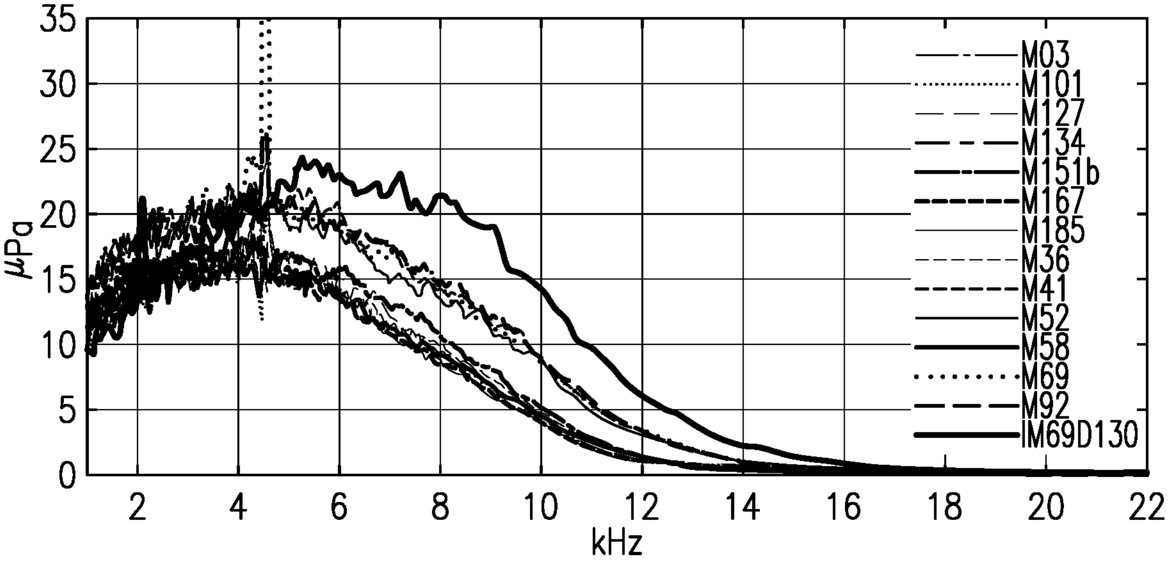
FIG. 16B shows CCIR-weighted power spectral density response plots with equalization.

FIGS. 16A and 16B show CCIR-weighted power spectral density response plots for various IBR frequencies of an IBR piezo MEMS microphone. More particularly, FIG. 16A shows CCIR-weighted power spectral density response plots without equalization, and FIG. 16B shows CCIR-weighted power spectral density response plots with equalization. From FIGS. 16A and 16B, one can see that an SNR improvement greater than 4 dB is realized.

Figure 17:
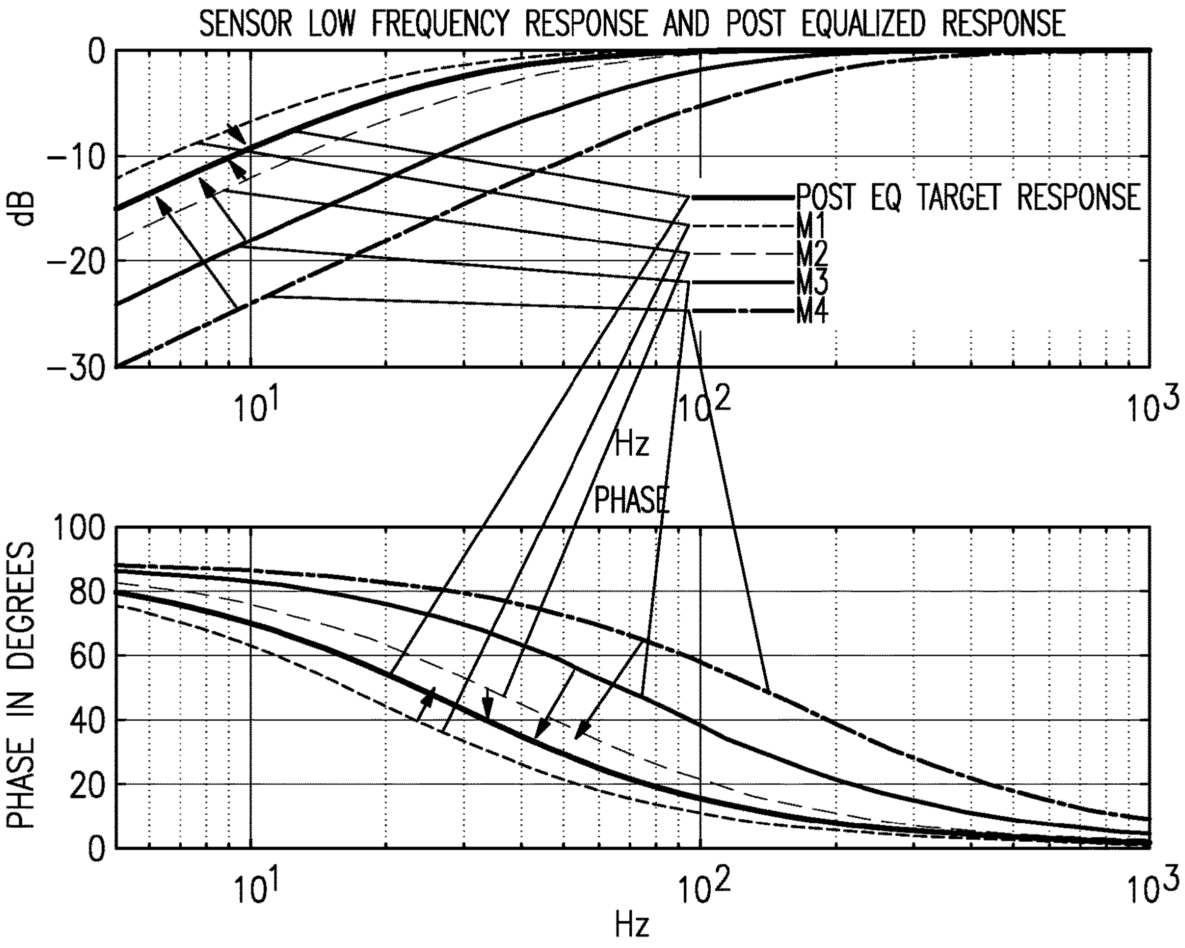
FIG. 17 shows an example of desirability of low frequency equalization during a production calibration process.

FIG. 17 shows an example of why low frequency equalization can be desirable during a production calibration process. It is noted that piezo cantilever MEMS have high variance in the low frequency roll off pole. This is due to stress variations across a wafer due to the process. It is further noted that low frequency corner stability is typically very good, but just not well controlled unit to unit. As shown in FIG. 17, an equalization as described herein can be implemented during, for example, a final test process to provide a very tightly controlled low frequency roll off.

Figure 18:
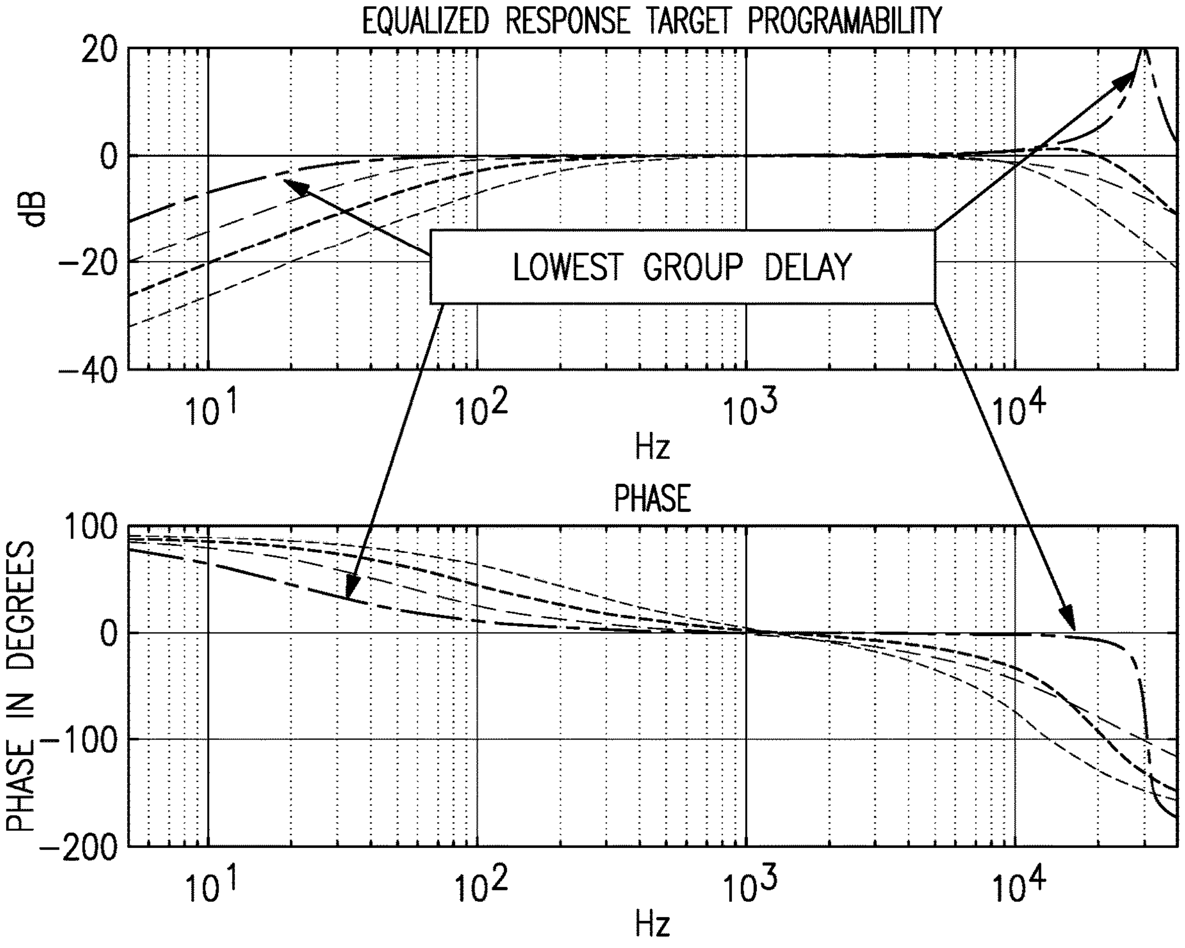
FIG. 18 shows an example of target response versatility that can be provided by a production calibration process.

FIG. 18 shows an example of target response versatility that can be provided by a production calibration process. In some embodiments, a target equalized response can be programmable at a final test stage as coefficients are written to, for example, one-time-programmable memory. In the example of FIG. 18, a high pass response is shown to have a programmable −3 dB frequency from 20 Hz to about 200 Hz with a 1 Hz resolution. FIG. 18 also shows example equalized high frequency responses of fp range of 5 k to 30 k, and Qp range of 0.5 to 20.

Figure 19:
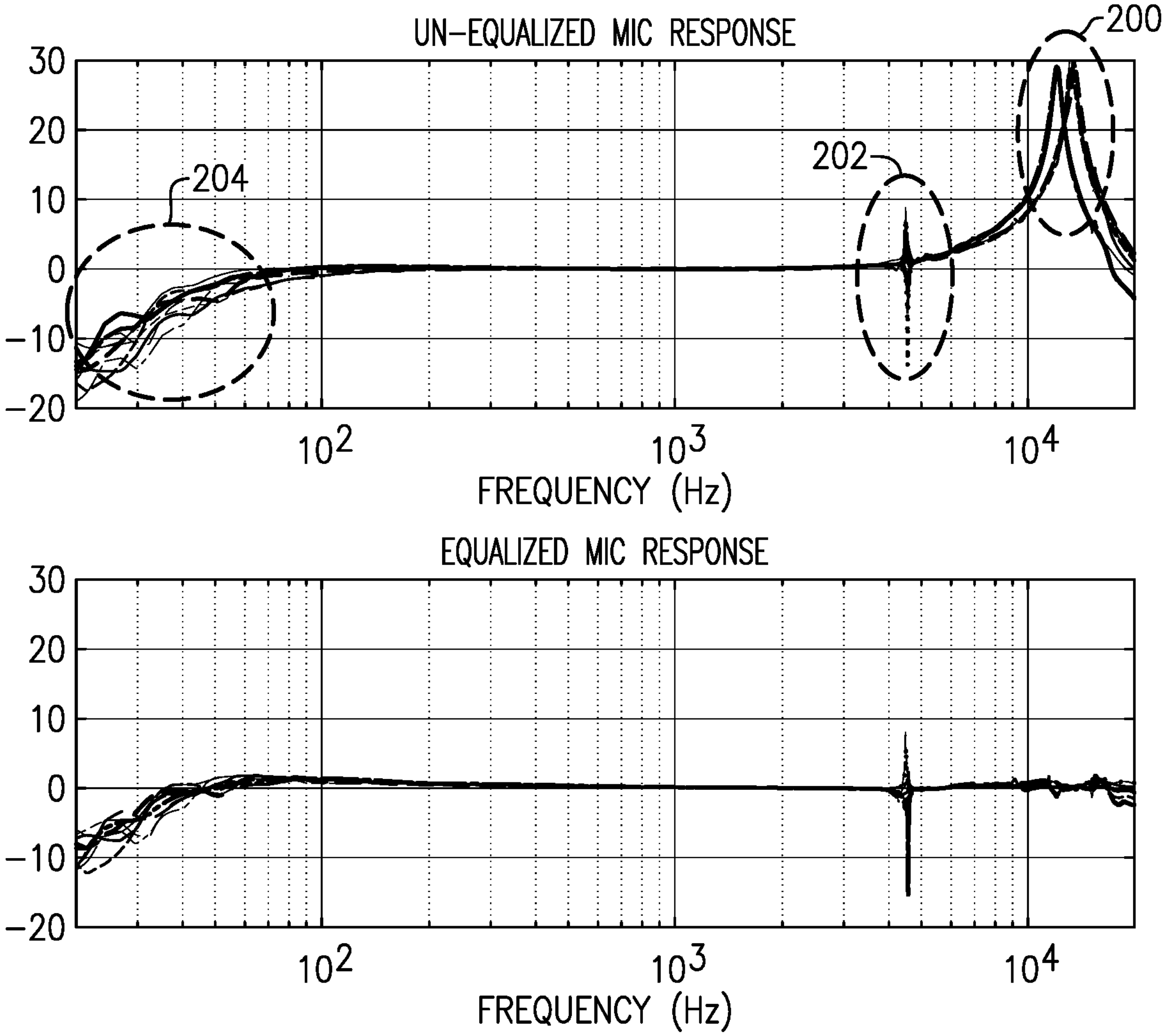
FIG. 19 shows examples of experimental data associated with a production equalization calibration process.

FIG. 19 shows examples of experimental data associated with a production equalization calibration process for sensor responses having IBR peaks 200. The upper set of curves is for data for microphone response without equalization, and the lower set of response of curves is for data for microphone response with equalization.

In FIG. 19, it is noted that the portions indicated as 204 and 202 indicate poor coherence from noisy measurement, and not a noisy sensor. In the example of FIG. 19, a target equalization can be achieved with an HP pole at 25 Hz, and a 2nd order LP with fp=25 kHz and Qp=0.6.

Figure 20:
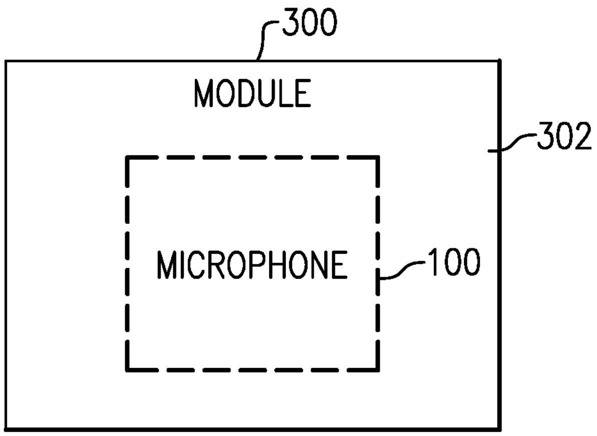
FIG. 20 shows that in some embodiments, a module can include a microphone having one or more features as described herein.

FIG. 20 shows that in some embodiments, a module 300 having a packaging substrate 302 can include a microphone 100 having one or more features as described herein. As described herein, such a microphone can include an IBR piezo MEMS sensor and an equalization component.

Figure 21:
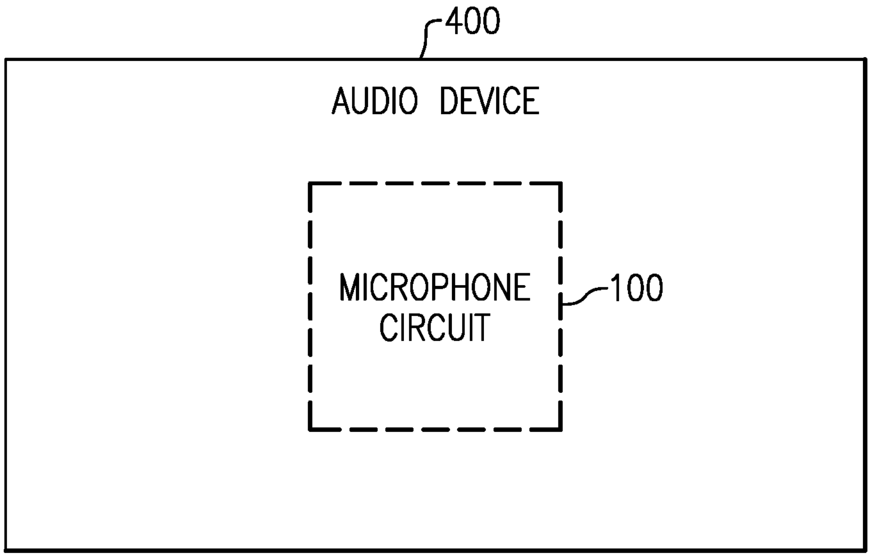
FIG. 21 shows that in some embodiments, an audio device can include a microphone having one or more features as described herein.

FIG. 21 shows that in some embodiments, an audio device 400 can include a microphone 100 having one or more features as described herein. As described herein, such a microphone can include an IBR piezo MEMS sensor and an equalization component. In some embodiments, the audio device can be any electronic device that includes a microphone for sensing and processing sound such as speech and/or music.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional subcomponents to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

The invention claimed is:

1. A microphone comprising:

a piezoelectric sensor configured to provide a response to acoustic energy in a frequency band, the response including an in-band resonance having a peak frequency within the frequency band; and an integrated circuit external to and coupled to the piezoelectric sensor, the integrated circuit including an analog-to-digital converter configured to convert an analog signal representative of the response of the piezoelectric sensor into a digital signal, the integrated circuit further including an equalizer configured to provide equalization of the digital signal, such that the equalizer removes or adjusts a portion of the digital signal representative of the in-band resonance, the integrated circuit further including a non-transitory computer readable medium having calibration data for the piezoelectric sensor and the equalizer to allow the removal or adjustment of the in-band resonance from the digital signal, the calibration data for the piezoelectric sensor configured to allow compensation for variance of low frequency corner property of the piezoelectric sensor, the calibration data for the equalizer configured to allow compensation for temperature dependence of the equalizer.

2. The microphone of claim 1 wherein the piezoelectric sensor is implemented as a micro-electromechanical systems (MEMS) device.

3. The microphone of claim 2 wherein the MEMS device is implemented as a cantilever structure.

4. The microphone of claim 1 wherein the integrated circuit is implemented as an application-specific integrated circuit.

5. The microphone of claim 1 wherein the calibration data specific for the piezoelectric sensor is provided to the non-transitory computer readable medium in a calibration process during or after production of the microphone.

6. The microphone of claim 1 wherein the integrated circuit further includes a temperature sensor configured to provide temperature information for the temperature dependence of the equalization of the digital signal.

7. The microphone of claim 1 wherein the frequency band includes an audible frequency band.

8. The microphone of claim 7 wherein the frequency band includes a range of 20 Hz to 20,000 Hz.

9. The microphone of claim 1 wherein the peak frequency if the in-band resonance is less than or equal to 12 KHz.

10. The microphone of claim 9 wherein the peak frequency if the in-band resonance is less than or equal to 8 KHz.

11. A microphone comprising:

a piezoelectric sensor configured to provide a response to acoustic energy in a frequency band, the response including an in-band resonance having a peak frequency within the frequency band; and a processing component external to and coupled to the piezoelectric sensor and configured to convert an analog signal representative of the response of the piezoelectric sensor into a digital signal, the processing component further configured to provide equalization of the digital signal to remove or adjust a portion of the digital signal representative of the in-band resonance, the processing component including a non-transitory computer readable medium having calibration data for the piezoelectric sensor and for the equalization of the digital signal to allow the removal or adjustment of the in-band resonance from the digital signal, the calibration data for the piezoelectric sensor configured to allow compensation for variance of low frequency corner property of the piezoelectric sensor, the calibration data for the equalization configured to allow compensation for temperature dependence of the equalization.

12. The microphone of claim 11 wherein the processing component is implemented to include an equalizer configured to provide the equalization.

13. The microphone of claim 11 wherein the piezoelectric sensor is implemented as a micro-electromechanical systems (MEMS) device.

14. A microphone comprising:

a piezoelectric sensor configured to provide a response to acoustic energy in a frequency band, the response including an in-band resonance having a peak frequency within the frequency band;

a digital equalizer external to and coupled to the piezoelectric sensor and configured to provide equalization of a digital signal representative of the response of the piezoelectric sensor; and a compensation component configured to adjust the equalization based on calibration data to compensate for variance of low frequency corner property of the piezoelectric sensor and compensate for temperature dependence of the digital equalizer.

15. The microphone of claim 14 wherein the temperature compensation component includes a temperature sensor implemented to sense temperature representative of the digital equalizer.

* * * * *